Dec. 29, 1942.   B. J. MELDRUM   2,306,823
LUBRICATING SYSTEM
Filed Feb. 18, 1941   2 Sheets-Sheet 1
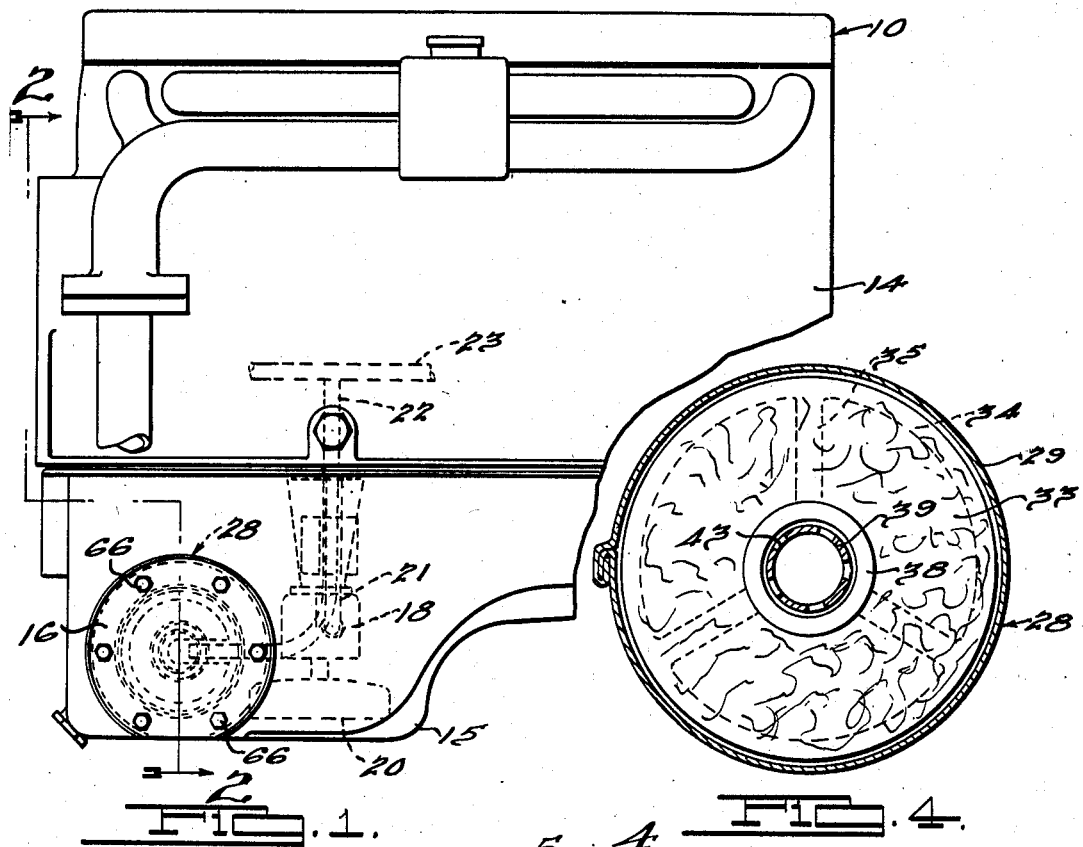
INVENTOR
Bernard J. Meldrum.
BY
Harness, Lind, Patee & Harris
ATTORNEYS.

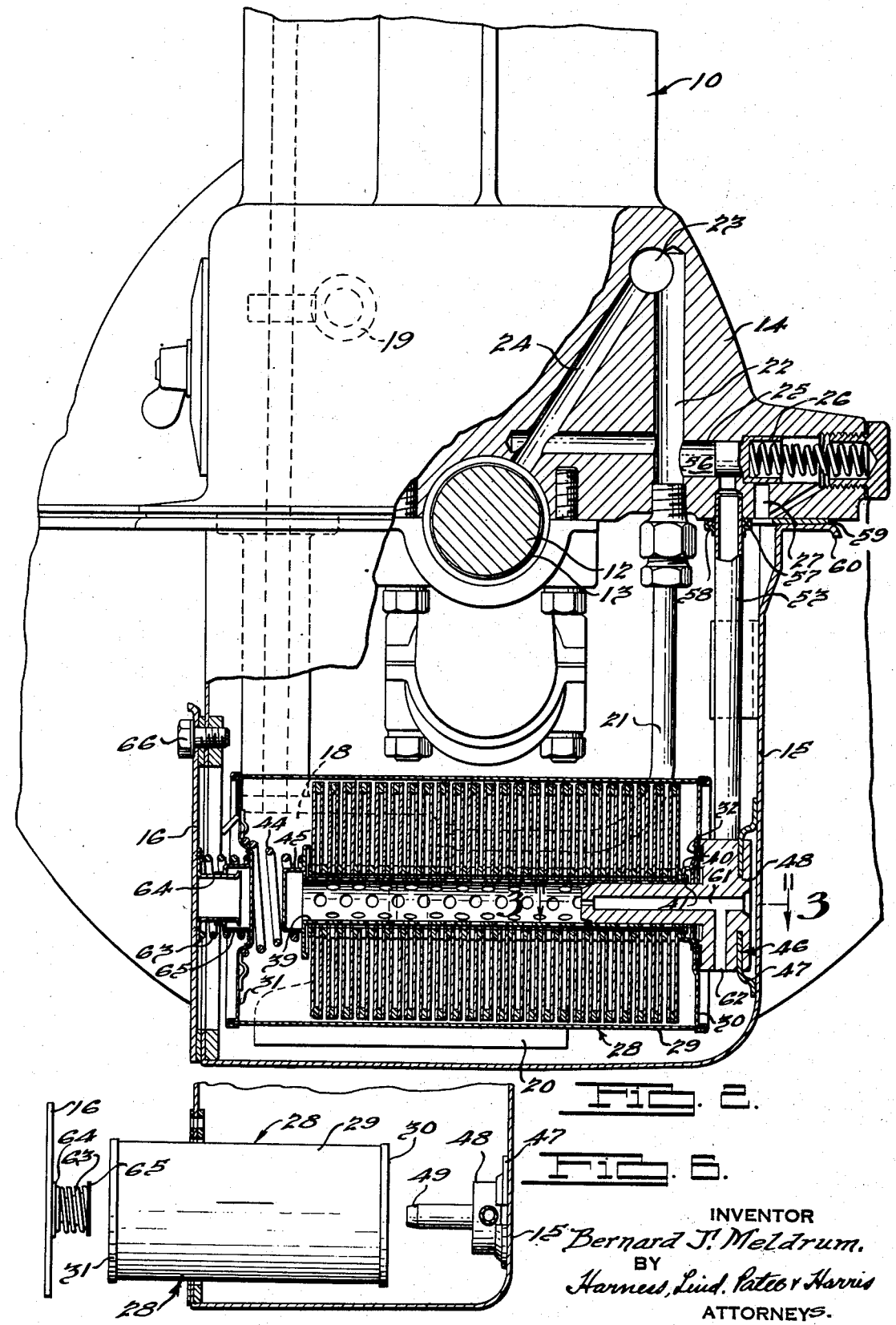

Patented Dec. 29, 1942

2,306,823

UNITED STATES PATENT OFFICE 2,306,823

LUBRICATING SYSTEM

Bernard J. Meldrum, Detroit, Mich., assignor to Chrysler Corporation, Highland Park, Mich., a corporation of Delaware Application February 18, 1941, Serial No. 379,499

3 Claims. (Cl. 123—196)

This invention relates to lubricating systems and has particular reference to internal combustion engine lubrication.

An object of the invention is to improve the filtration of lubricant and when applied to an internal combustion engine to so dispose the filter as to render the same readily accessible for examination and replacement as well as to simplify the mounting of the filter and connection therefore of with the lubricating system.

A further object of the invention is to dispose the filter in the crankcase of the internal combustion engine whereby improved lubrication is had for initial engine operation and to improve engine appearance.

A still further object of the invention is the provision of improved means for removably mounting a filter in the crankcase of an internal combustion engine, and to so dispose the filter with respect to the lubricating system that lubricant will be supplied to engine parts in the event the filter should become inoperative, such as by clogging of the filtering element.

Fig. 1 is a fragmentary elevational view of an internal combustion engine having a lubricating system embodying the invention.

Fig. 2 is an elevational view, partly in section taken as indicated by the line 2—2 of Fig. 1.

Fig. 3 is an enlarged sectional view taken on line 3—3 of Fig. 2.

Figs. 4 and 5 are transverse sectional views taken as indicated by the lines 4—4 and 5—5, respectively, of Fig. 3.

Fig. 6 is a view illustrating more particularly the installation and removal of the filter element.

Referring to the drawings, the reference numeral 10 designates an internal combustion engine 10 having a crankshaft 12 suitably journaled in axially spaced bearings, one of which is shown at 13, a block 14, and an oil pan 15 secured to the latter and forming a lubricant reservoir. A wall of the pan 15 has an opening to accommodate access to the interior thereof and a closure 16 for the opening.

A pump 18 driven from the engine camshaft 19 has its inlet 20 so disposed as to withdraw oil from the reservoir and the outlet thereof communicating with a conduit 21 communicating with a vertically extending oil passage 22 in the block 14. The passage 22 communicates with an oil passage 23 extending longitudinally of the block 14 and passages 24 lead from each bearing 13 to the passage 23. The conduit 21 and passages 22, 23 and 24 constitute an oil flow connection between the pump 18 and the bearing 13. The passage 22 communicates with a passage 25 controlled by a spring pressed valve 26, it being understood that when the oil pressure reaches a predetermined maximum the valve 26 will be moved off its seat to permit passage of lubricant thereby and through the passage 27 back to the reservoir.

Positioned within the reservoir provided by the pan 15 is a filter, generally indicated by the numeral 28 including a cylindrical casing 29 having oppositely disposed end walls 30 and 31. The wall 30 has a central opening therein and a plurality of circumferentially spaced openings 32 through which oil to be filtered is admitted to the casing forming the filtering chamber.

The filter includes a plurality of pairs of filter elements 33 preferably comprising a filtering paper, the elements of each pair being respectively secured to a side face of the rim 34 of a spider having circumferentially spaced spokes 35, each spoke being connected with a hub segment 36. The adjacent segments are spaced apart to provide slots as indicated at 37. The filter elements are centrally apertured to provide a passage registering with the passage in the casing end wall 31. The adjacent pairs of filter elements are spaced apart by a spacer 38 adjacent the central passage.

Positioned in the central passage aforesaid is a tubular member 39 having an end thereof extending through the aperture of a support 40 secured to the casing wall 30, this end portion being flanged as at 41. The member 39 has a diameter less than the diameter of the central passage providing a space 42 accommodating axial flow of filtered oil, the latter passing through perforation 43 to the interior of the member 39. It will be understood that oil admitted through the inlet openings 32 passes through at least one of the filters 33, through a slot 37 to space 42 and thence through perforations 43 to the interior of the member 39.

The plurality of pairs of filter elements 33 are urged axially toward the casing wall 30 by a spring 44 acting between a closure cap 45 for the member 39 and the casing end wall 31.

For mounting and supporting the filter 28 in the oil reservoir there is provided a member 46, formed by die casting for example, having a portion of a sheet metal attaching element 48 cast therein, this element having a flange secured to the adjacent wall of the pan 15. The member 46 has an enlarged head 48 and a stem 49, the face of the head adjacent the latter having a circumferential groove 50 therein. Abutting this face and overlying the groove 50 is an annular washer 51 having openings 52 therein registering respectively with the openings 32 in the casing end wall 30, the latter abutting the washer 51.

Cast into the head 48 is a conduit 53 having an aperture 54 registering with an aperture 55 communicating with the groove 50. The conduit 53 extends upwardly and into the counterbore of a passage 56 in the block 14 communicating with the passage 25 at a point to the right of the valve 26 as viewed in Fig. 2. A felt washer 57 is maintained in sealing relationship with respect to the passage 56 and conduit 53 by a ferrule 58 secured to the latter, and a soluble gasket 59 is disposed between the flange 60 of the pan 15 and adjacent face of the block 15, this gasket accommodating flow of oil through the passage 27 into the reservoir.

The tubular member 39 communicates with the reservoir by means of a passage 61 extending through the stem 49 and head 48 of the supporting member and communicating with a transversely extending passage 62. Oil passing axially of the passage 61 beyond the passage 62 is discharged between adjacent faces of the member 46 and the pan 15, the member 46 being cut away as indicated more particularly in dotted lines in Fig. 1 to permit oil to escape from the space between the member 46 and pan 15, and to provide clearance for the conduit 53.

The filter is urged axially relative to the stem to the position shown by a spring 63 acting between relatively movable telescoping parts 64 and 65, flanged to prevent relative separation, the part 65 abutting the casing end wall 31 and the part 64 being secured to the closure 16. When it is desired to remove the filter 28 the screws 66 are removed and the closure 16, spring 63 and parts 64, 65 are removed as a unit permitting access to and removal of the filter as illustrated in Fig. 6.

In operation of the system, the pump 18 is set in operation upon starting of the engine 10 and oil is supplied under pressure through the flow connection provided by the conduit 21 and passages 22, 23, 24 to the bearing 13. It is desirable to maintain a predetermined pressure supply of lubricant to the parts to be lubricated and when the same is exceeded the valve 26 moves off its seat thereby accommodating the passage of oil under pressure to the filter element 28 by the flow connection including the passage 58, conduit 53 leading to the oil passages in the support member 46 and thence into the filtering chamber of the casing as aforesaid. The arrangement insures the requisite lubricant pressure to the parts to be lubricated in that the flow connection to the filter inlet will not function until the predetermined pressure as aforesaid is established. Thus should there occur a leak in the flow connection to the inlet of the filter or should the latter be intentionally removed, lubricant will not be by-passed by the latter flow connection to the reservoir.

Disposition of the filter within the reservoir provided by the pan 15 eliminates the necessity for external piping and the possibility of leaks resulting in loss of oil and lack of lubrication. Better filtration will be had because the temperature to which the filter is subjected will be normally higher and this is particularly true in cold weather when the "warm-up" period will be relatively short. The exterior disposition of the filter, the mounting brackets, tubings and fittings therefor present an unsightly appearance and the disposition thereof according to the invention improves the appearance of the engine compartment. The invention has the further advantage of making possible a relatively economical replacement filter unit and the latter is readily accessible during oil change.

I claim:

1. In a lubricating system for an internal combustion engine having a lubricating pump and a lubricant reservoir provided with opposed walls, a first fluid conducting means leading from said pump to an engine part to be lubricated, a support member in said reservoir including a base portion secured to one of said walls having fluid inlet and outlet passages, and a stem portion integral with said base portion projecting therefrom toward the other of said walls and provided with a passage communicating with said base outlet passage, a second fluid conducting means leading from said first means including a conduit secured to said support member having an outlet opening communicating with the inlet passage of said base portion, a unitary filter element removably disposed within said reservoir having a fluid outlet forming central passage detachably receiving said stem portion and in fluid communication with the passage thereof, said other wall having an opening therein aligned with said stem portion for accommodating passage of the filter element therethrough, a closure for said opening, and a spring acting between said closure and filter element for urging the latter toward said support.

2. In a lubricating system for an internal combustion engine having a crankcase and an oil pump; a first fluid conducting means leading from the pump to an engine part to be lubricated, a second fluid conducting means leading from said first means, a filter element in said crankcase comprising a casing having opposed walls, one of said walls having a fluid inlet opening and a support receiving opening, filtering means in said casing in fluid receiving relation with said fluid inlet opening and having a central passage therein registering with said support receiving opening and constituting a fluid outlet, a support member for said filter element disposed in said crankcase including a head portion attached to a crankcase wall and having an opening therein for conducting fluid from said second fluid conducting means to said filter element, said member having a supporting stem integral with said head portion extending through said wall support receiving opening into said central passage and having fluid passage forming means therein communicating with said crankcase, and means acting between the other wall of said filter casing and said crankcase for maintaining said filter element on said stem.

3. In a lubricating system for an internal combustion engine having a crankcase including opposed walls; an oil pump, fluid conducting means leading from the pump to an engine part to be lubricated, a fixture in said crankcase attached to one of said walls thereof and having fluid inlet and outlet means respectively communicating with said fluid conducting means and said crankcase, said fixture including a supporting stem having a portion of said outlet means included therein, and a unitary filter element disposed in said crankcase having a fluid inlet registering with said inlet means and a fluid forming outlet passage detachably receiving said stem for support thereby and in fluid communication with said outlet means, the other of said crankcase walls having an opening therein aligned with said fixture for accommodating passage of said filter element therethrough.

BERNARD J. MELDRUM.